(12) United States Patent
Burns

(10) Patent No.: US 7,163,227 B1
(45) Date of Patent: Jan. 16, 2007

(54) MULTI-POSITION TRACK WIDTH SENSOR FOR SELF-PROPELLED AGRICULTURAL SPRAYERS

(76) Inventor: Kerry C. Burns, P.O. Box 346, Ceresco, NE (US) 68017

( * ) Notice: Subject to any disclaimer, the term of this patent is extended or adjusted under 35 U.S.C. 154(b) by 396 days.

(21) Appl. No.: 10/738,104

(22) Filed: Dec. 17, 2003

(51) Int. Cl.
*B62D 21/14* (2006.01)

(52) U.S. Cl. ............... 280/638; 301/128; 180/906; 280/43.16

(58) Field of Classification Search ............... 180/906; 280/43.15, 43.16, 43.17, 840, 638; 301/128; 324/207.16, 207.15, 207.24; 33/710
See application file for complete search history.

(56) References Cited

U.S. PATENT DOCUMENTS

| | | | |
|---|---|---|---|
| 3,654,549 A | 4/1972 | Maurer et al. ............ 324/34 D |
| 3,964,565 A | 6/1976 | Cagle et al. ............ 180/70 R |
| 4,107,604 A * | 8/1978 | Bernier .................... 324/207.2 |
| 4,403,515 A | 9/1983 | Iwasaki ................... 73/862.38 |
| 4,577,509 A | 3/1986 | Moser ......................... 73/658 |
| 4,619,340 A | 10/1986 | Elmer et al. ................ 180/209 |
| 4,793,241 A | 12/1988 | Mano et al. .................. 92/5 R |
| 4,836,578 A * | 6/1989 | Soltis ........................ 280/6.15 |
| 5,083,630 A | 1/1992 | Zaun .......................... 180/209 |
| 5,282,644 A | 2/1994 | Larson ....................... 280/638 |
| D351,843 S | 10/1994 | Larson et al. ................ D15/13 |
| 5,438,261 A | 8/1995 | Codina et al. ......... 324/207.16 |
| 5,454,583 A * | 10/1995 | Torborg ..................... 280/638 |
| 5,463,596 A * | 10/1995 | Siefken ........................ 367/98 |
| 5,489,113 A * | 2/1996 | Torborg ..................... 280/638 |
| 5,901,800 A * | 5/1999 | Wilson et al. ............ 180/9.48 |
| 5,909,116 A | 6/1999 | Jin et al. ............... 324/207.24 |
| 6,042,020 A | 3/2000 | Weddle ...................... 239/166 |
| 6,199,769 B1 | 3/2001 | Weddle ...................... 239/172 |
| 6,206,125 B1 | 3/2001 | Weddle ...................... 180/209 |
| 6,253,460 B1 * | 7/2001 | Schmitz ....................... 33/706 |
| 6,356,075 B1 * | 3/2002 | Shank ................... 324/207.24 |
| 6,892,124 B1 * | 5/2005 | Humpal et al. ............... 701/50 |

OTHER PUBLICATIONS

Internet advertisement of ag-chem for the "RoGator 864", undated.
Internet advertisement of ag-chem for the "RoGator 1264", undated.

* cited by examiner

*Primary Examiner*—Paul N. Dickson
*Assistant Examiner*—Leonard J. McCreary, Jr.
(74) *Attorney, Agent, or Firm*—Thomte, Mazour & Niebergall; Dennis L. Thomte

(57) ABSTRACT

A multi-position track width sensor for agricultural sprayers wherein a piston rod position sensor is connected to each of the adjustable axle members of the front and rear axle assemblies of the sprayer. A display panel is mounted in the cab of the sprayer and includes LEDs which indicate various positions of the piston rods with respect to the respective cylinder.

7 Claims, 7 Drawing Sheets

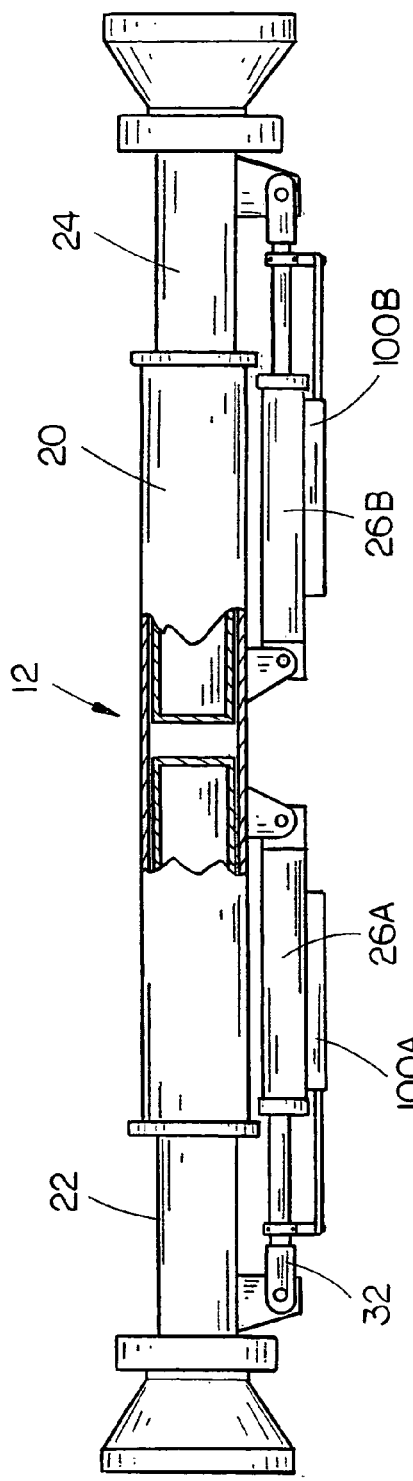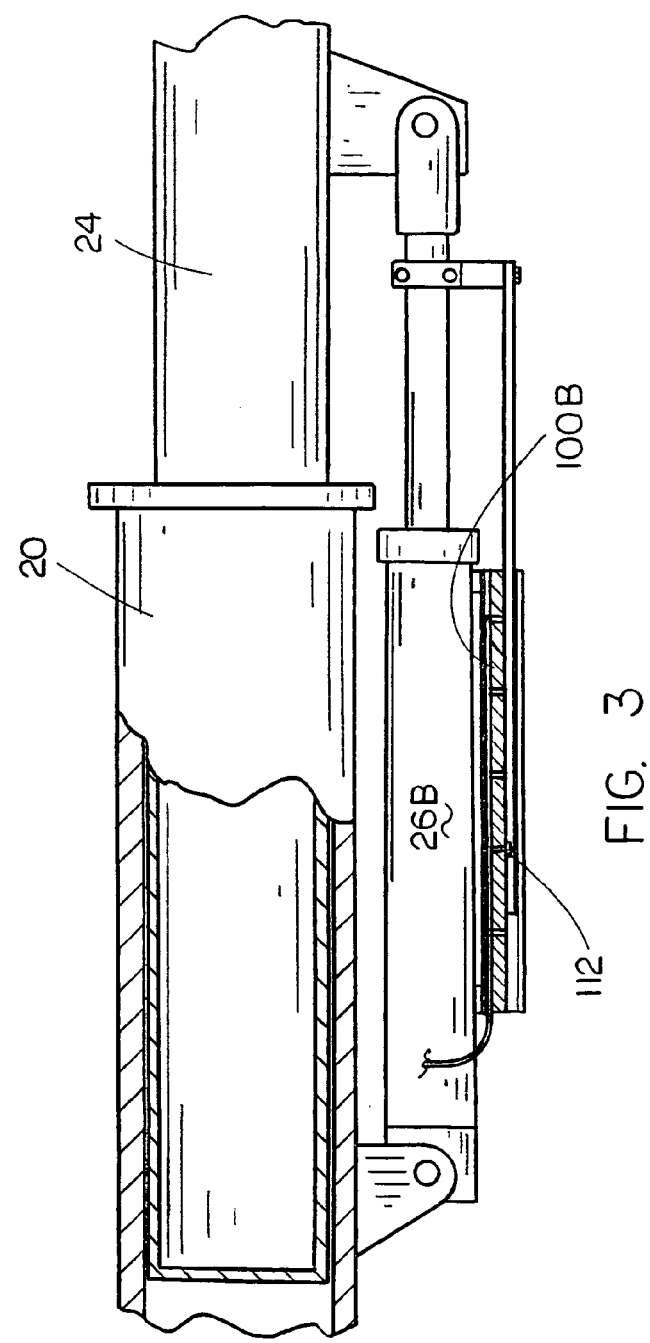

MULTI-POSITION TRACK WIDTH SENSOR FOR SELF-PROPELLED AGRICULTURAL SPRAYERS

BACKGROUND OF THE INVENTION

1. Field of the Invention

This invention relates to a multi-position track width sensor for agricultural sprayers and more particularly to a means which enables the sprayer operator to adjust the track width of the vehicle in a precise manner without dismounting the vehicle.

2. Description of the Related Art

High clearance vehicles such as the RoGator® 864 and 1264 manufactured by Ag-Chem, a division of AGCO Corporation, 4205 River Green Parkway, Duluth, Ga. 30096, are used to spray fields with pre-emerge and post-emerge chemicals, fertilizers, insecticides, etc. Other types of high clearance vehicles are described in U.S. Pat. Nos. 6,206,125; 5,282,644; 4,619,340; 5,083,630; and 3,964,565. The RoGator® vehicles, as well as the vehicles of the above-identified patents, include mechanisms to adjust the wheel spacing, track width or tread width of the vehicle to enable the vehicle to be used in different row crop spacings. Many of the prior art vehicles of the type described utilize transversely extending axle mechanisms which are moved inwardly and outwardly with respect to the vehicle chassis to vary the track width. In most cases, the axle assemblies are moved transversely by means of a hydraulic cylinder.

For example, in the RoGator® vehicles, each of the front and rear axle assemblies include a tubular axle housing having a pair of axle members slidably mounted therein with each of the axle members being slidably moved by means of a hydraulic cylinder connected thereto. In the RoGator® vehicles, a yard stick-type of printed or painted scale is provided on each axle member which indicates the amount of extension or retraction of the axle member with respect to the axle housing. The track width of the RoGator® vehicles is adjusted as follows: (1) the vehicle is slowly moved forwardly or rearwardly as the hydraulic cylinder for the first axle member is operated to extend or retract the axle member with respect to its respective tubular axle housing until the operator believes the axle member has been retracted or extended to the desired location; (2) the operator brings the vehicle to a halt; (3) the operator dismounts from the vehicle and reads the track width scale on the axle member being adjusted; (4) if the axle member is not exactly positioned in the desired position, which is the usual case, the operator mounts the vehicle and moves the same forwardly or rearwardly while operating the same hydraulic cylinder again until the operator believes that the axle member is in its desired retracted or extended position; (5) steps (3) and (4) are repeated until the axle member is in the proper position; and (6) steps (1)–(5) are repeated for the other three axle members. In some cases, the operator may attempt to adjust one or more axle members simultaneously rather than sequentially. As can be appreciated, the adjustment of the track width of the vehicle is tedious and time-consuming.

SUMMARY OF THE INVENTION

A multi-position track width sensor is described for use with adjustable track width vehicles such as a agricultural sprayers. The vehicle comprises a chassis having front and rear ends, and opposite sides with a front axle assembly at the front end of the chassis and a rear axle assembly at the rear end of the chassis. Each of the front and rear axle assemblies are selectively extendable in a longitudinal direction between a first and second position with the longitudinal movement being transverse with respect to the centerline of the vehicle.

Each of the front and rear axle assemblies includes an elongated tubular axle housing having a pair of telescoping axle members mounted therein with each of the axle members having a hydraulic cylinder connected thereto for moving the associated axle member with respect to the respective axle housing to adjust the track width of the vehicle. Each of the axle members has a wheel connected thereto. Each of the hydraulic cylinders includes a cylinder having a piston slidably mounted therein and a piston or cylinder rod secured to the piston which slidably extends from the cylinder. Each of the hydraulic cylinders has a piston rod position sensor associated therewith which senses the position of the piston rod. Each of the piston rod position sensors is connected to a piston rod position display panel located in the cab of the vehicle.

As the vehicle is slowly driven either forwardly or rearwardly, the operator operates one of the hydraulic cylinders until a sensor light on the display panel is illuminated to indicate that the axle member connected to that particular hydraulic cylinder is in the proper position. The operator sequentially operates the remaining three hydraulic cylinders to position the associated axle members in the proper position. The track width spacing of the vehicle is adjusted without the need for the operator to dismount the vehicle.

It is a principal object of the invention to provide a multi-position track width sensor for use with an agricultural sprayer or the like.

Still another object of the invention is to provide a multi-position track width sensor of the type described which enables the track width of the vehicle to be easily and quickly positioned in the proper position without the operator leaving the vehicle.

These and other objects will be apparent to those skilled in the art.

BRIEF DESCRIPTION OF THE DRAWINGS

FIG. 2 is a front view of one of the axle assemblies of the vehicle of FIG. 1 with portions thereof cut away and which illustrates the instant invention mounted thereon;

FIG. 3 is a front view of a portion of one of the axle assemblies of the vehicle of FIG. 1 and which illustrates the instant invention mounted thereon with portions of the axle assembly and the instant invention cut away to more fully illustrate the same;

DETAILED DESCRIPTION OF THE INVENTION

The numeral 10 refers generally to an agricultural vehicle which is used in row crop applications for applying fertilizer, insecticide, pre-emergence, post-emergence, etc. A typical vehicle is that sold by Ag-Chem Equipment Company, Inc., of Minnetonka, Minn., under the designation of trademark RoGator® 864, RoGator® 1264, etc. The vehicle 10 is a high clearance vehicle and has the capability of adjusting the track width thereof to compensate for different row crop spacings. Although many other manufacturers offer vehicles having adjustable track widths, most of the adjustable track width vehicles include an adjustable front axle assembly and an adjustable rear axle assembly. U.S. Pat. No. 5,282,644 illustrates an adjustable track width vehicle wherein each of the front and rear axle assemblies includes a rigid tubular axle housing having a pair of axle members selectively slidably mounted therein which are each slidably moved by hydraulic cylinder to adjust the distance or spacing between wheels operatively secured to the outer ends of the axle members. U.S. Pat. No. 6,206,125 discloses an adjustable width axle assembly of a crop sprayer wherein the axle members are mounted in offset axle tubes.

Figure 1:
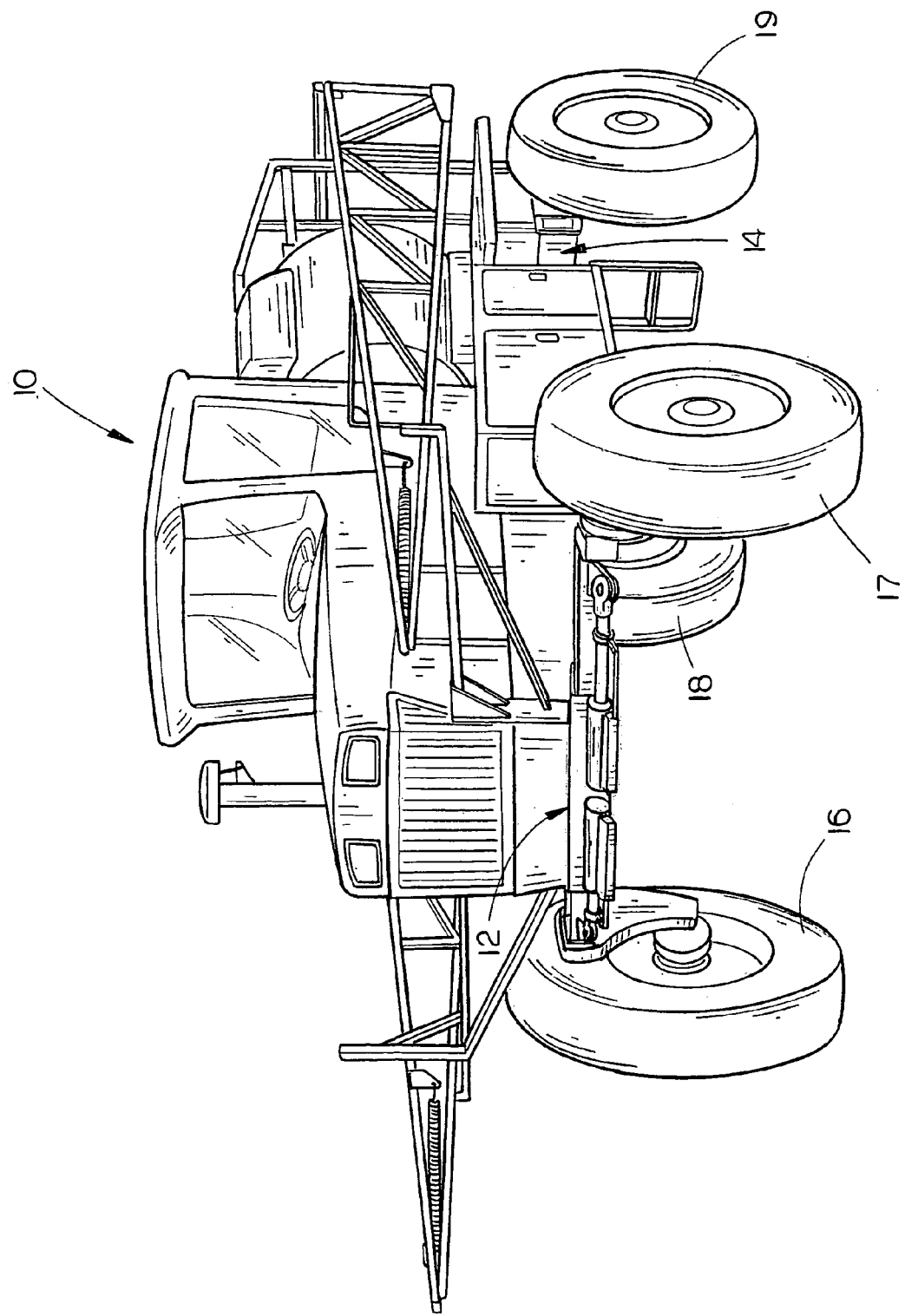
FIG. 1 is a front perspective view of a high clearance vehicle such as a sprayer having the instant invention mounted thereon.
Figure 4:
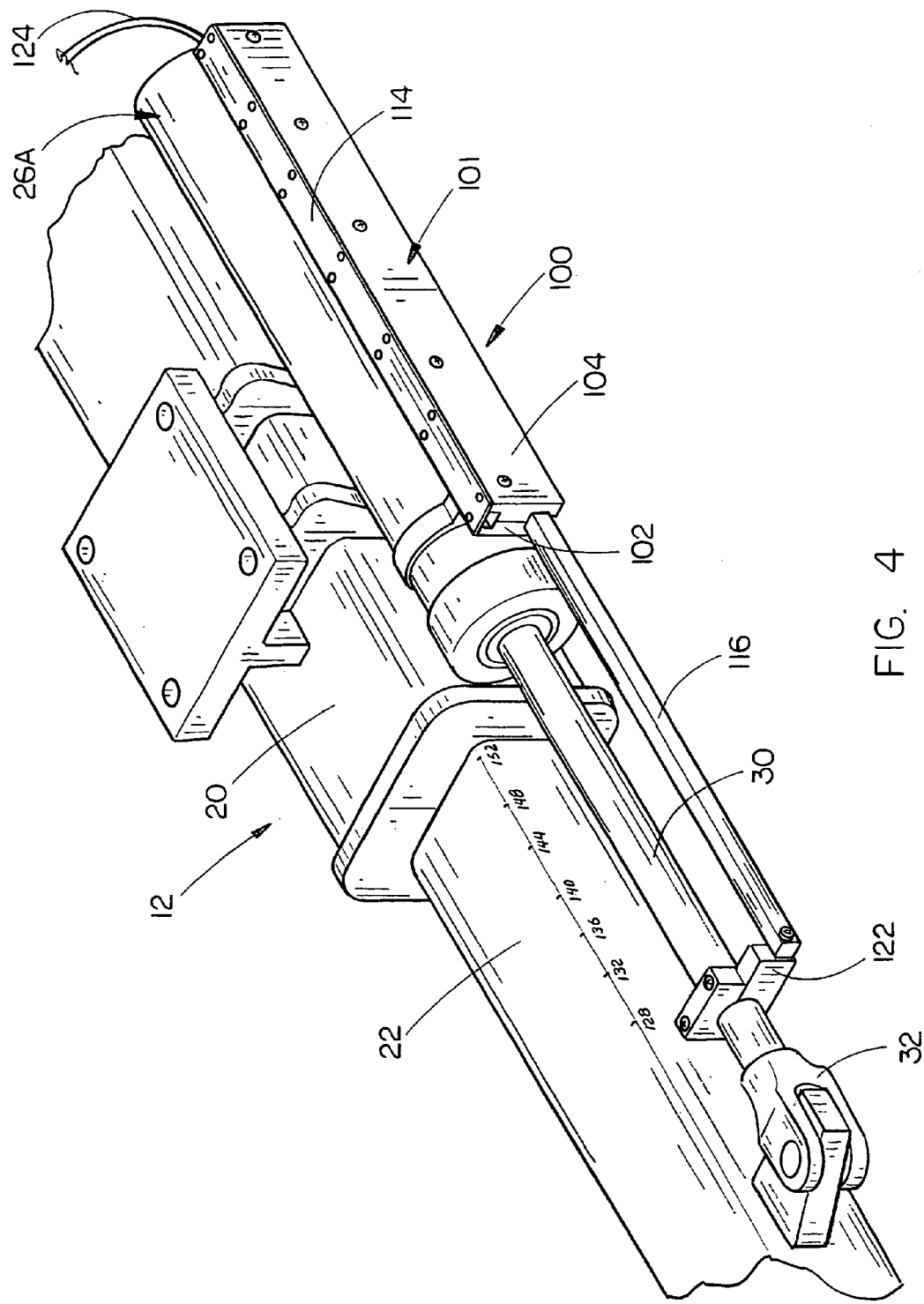
FIG. 4 is a partial perspective view of one of the axle assemblies of the vehicle of FIG. 1 and which illustrates the instant invention mounted thereon.
Figure 5:
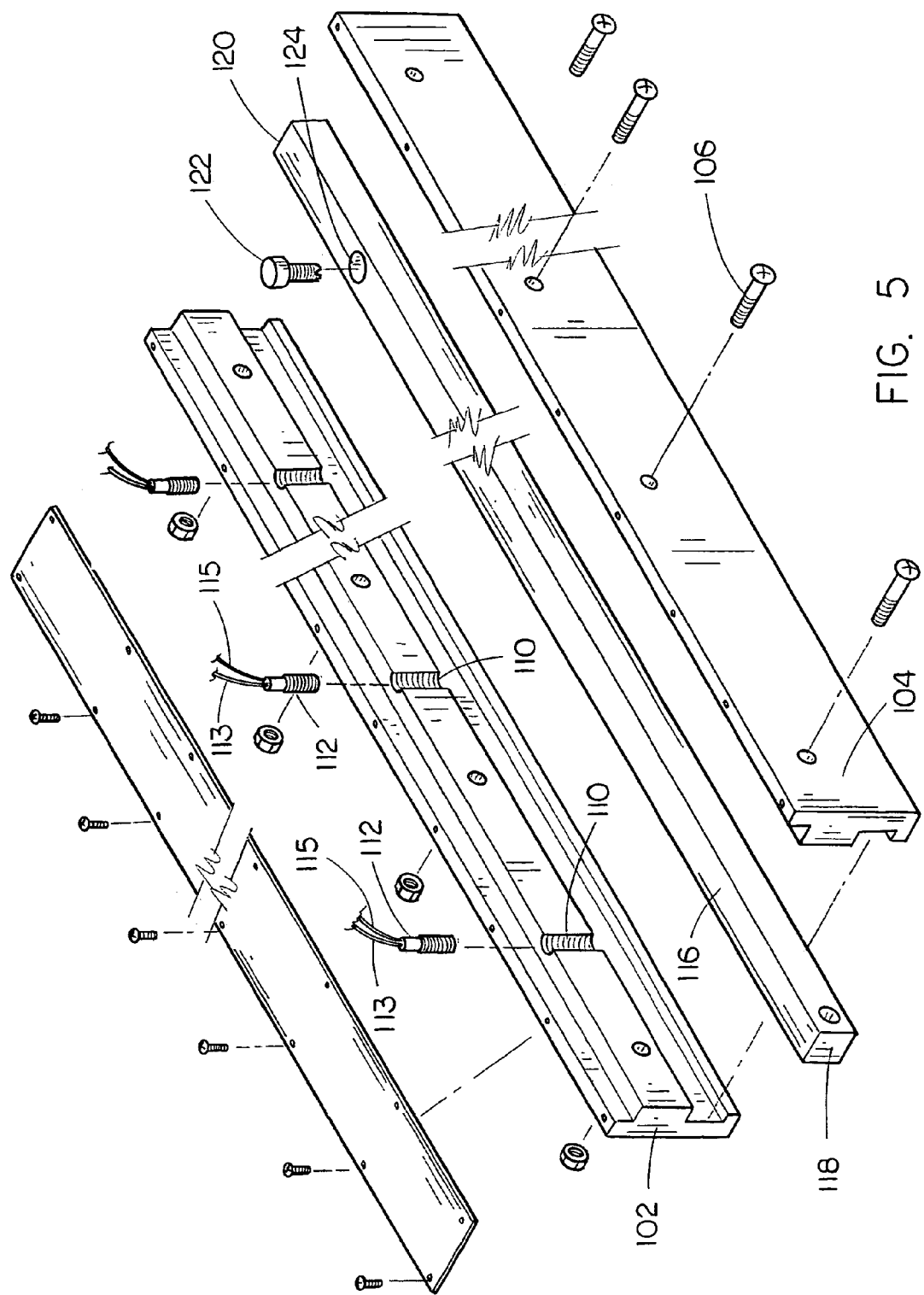
FIG. 5 is a partial exploded perspective view of the instant invention.
Figure 6:
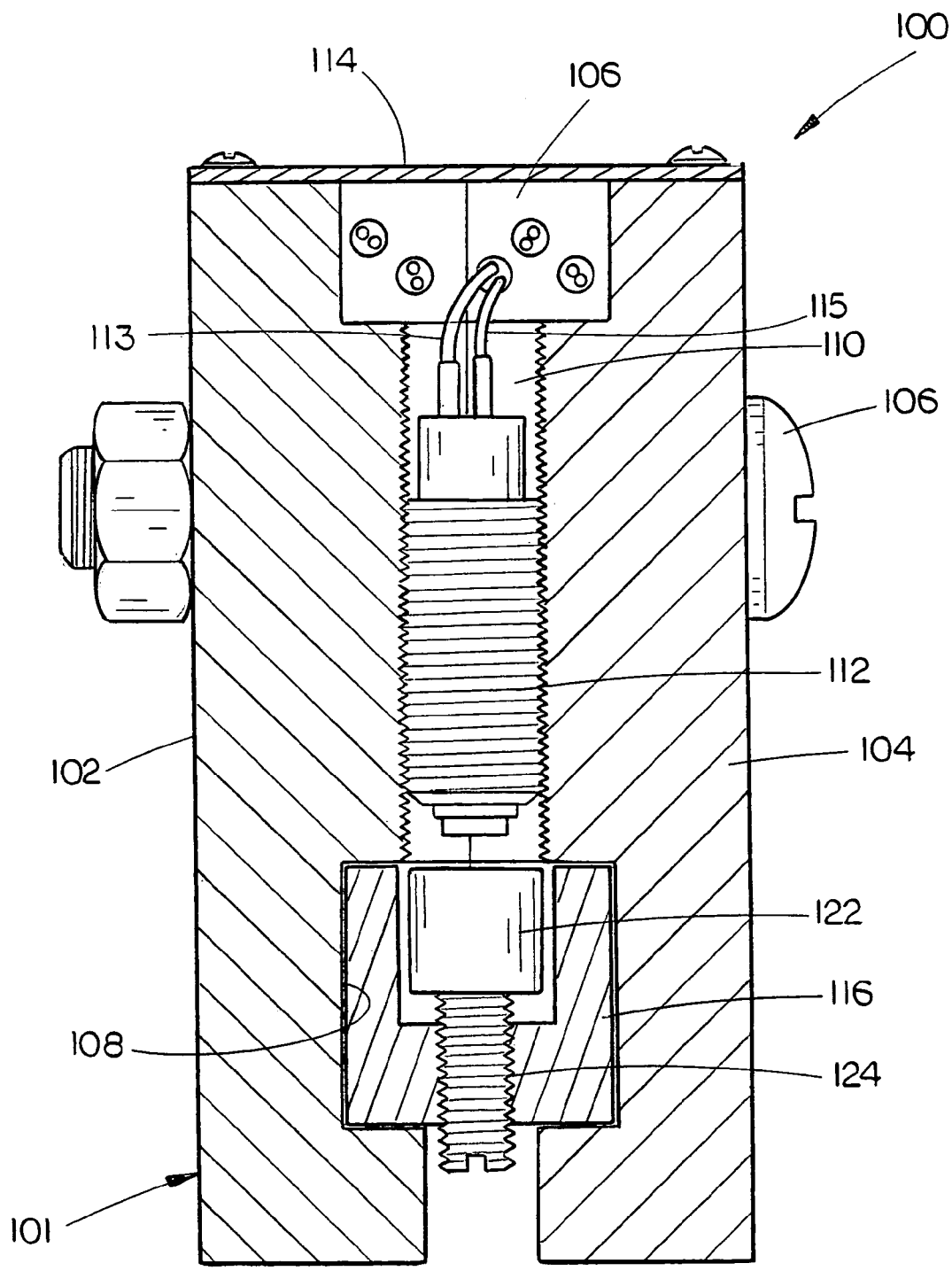
FIG. 6 is a sectional view of the piston rod sensor of the instant invention.
Figure 7:
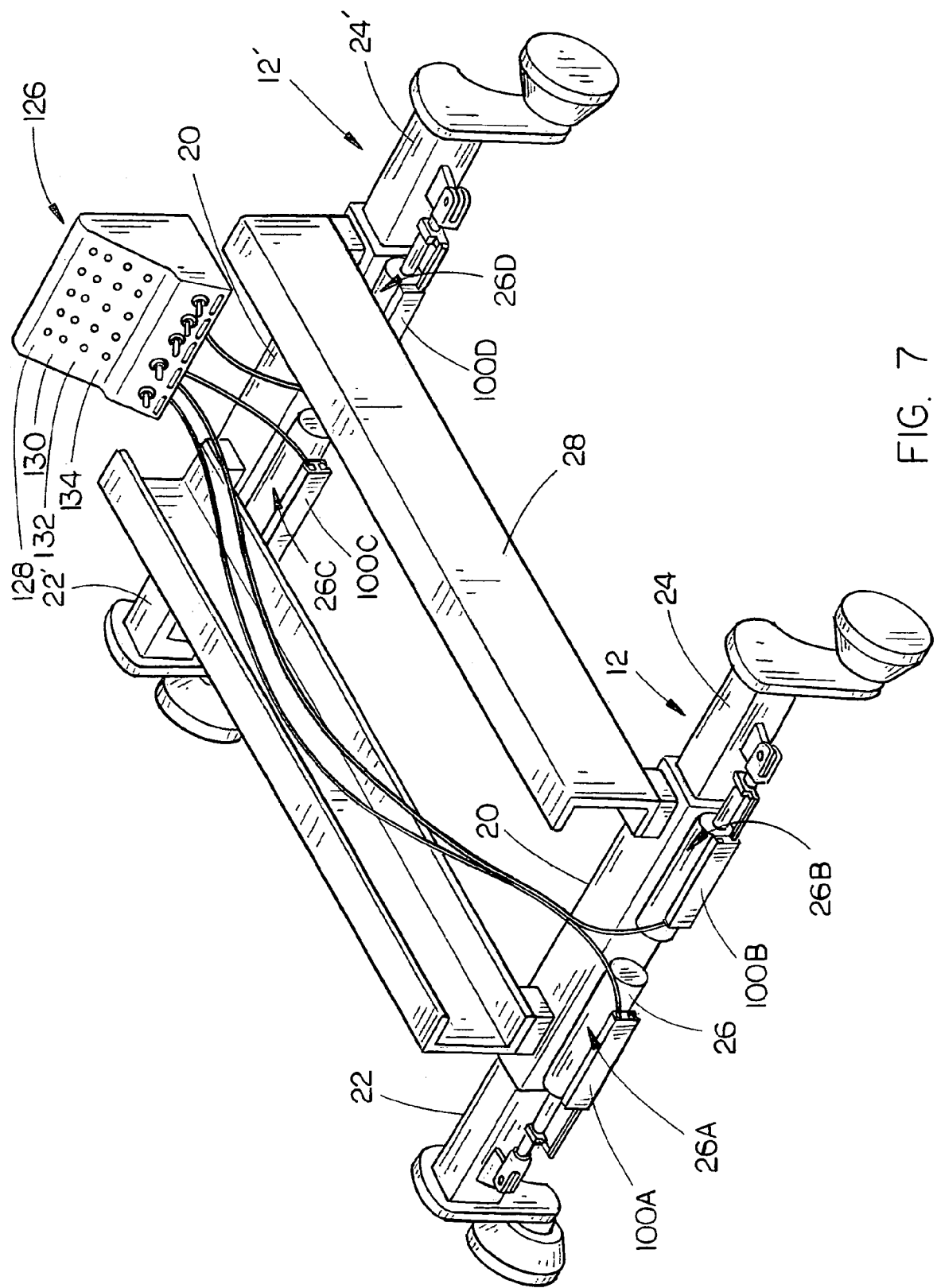
FIG. 7 is a partial perspective view of the axle assemblies of the vehicle of FIG. 1 together with the instant invention.

Referring to FIG. 1, the vehicle 10 will be described as including a front axle assembly 12 and a rear axle assembly 12'. Front wheels 16 and 17 are mounted on the front axle assembly and rear wheels 18 and 19 are mounted on the rear axle assembly. Axle assembly 12 includes a centrally disposed tubular axle housing 20 having tubular axle members 22 and 24 slidably mounted therein. Axle assembly 12' includes a tubular axle housing 20' having axle members 22' and 24' slidably mounted therein. One of the wheels is operatively connected to the outer end of each of the axle members in conventional fashion. Hydraulic cylinders 26A, 26B, 26C and 26D are provided for the axle members 22, 24, 22' and 24', respectively, with the base end of the cylinders 26A, 26B, 26C and 26D being secured to the axle housings of the vehicle 10. Inasmuch as each of the cylinders 26A, 26B, 26C and 26D are identical, only one of the cylinders will be described in detail. A conventional piston is slidably mounted in each of the hydraulic cylinders 26 and has a piston rod or cylinder rod 30 secured thereto which extends outwardly through the rod end of the cylinder. The outer end of the rod 30 has a clevis 32 mounted thereon which is secured to the cylinder rod 30 with the clevis 32 being secured to the associated or respective axle member. Thus, extension of the cylinder rod 30 causes the wheel connected to the associated axle member to be moved laterally outwardly from the chassis 28. Conversely, retraction of the cylinder rod 30 causes the associated axle member to be moved inwardly towards the chassis 28. It is to this conventional structure, or structure similar thereto, that applicant's invention is mounted to enable the operator of the vehicle to determine and control the positioning of the wheels to adjust the track width of the vehicle to accommodate different row crop spacing without leaving the cab of the vehicle.

The numeral 100 refers to the piston rod position sensor of this invention which is mounted on each of the hydraulic cylinders 26A, 26B, 26C and 26D. For purposes of description, the sensors will be described as 100A, 100B, 100C and 100D. Each sensor 100 includes a housing 101 comprised of a pair of housing members 102 and 104 which are bolted together by stainless steel bolts 105. Housing members 102 and 104 are preferably constructed from UHMW plastic, but may also be constructed of polyethylene. The inner surfaces of the housing members 102 and 104 are shaped so as to define a first recessed area or channel 106 and a second recessed area or channel 108. Spaced-apart bores 110 are drilled into the housing members 102 and 104, as seen in the drawings. The bores 110 may be threaded or non-threaded. A normally open, magnetically operated proximity switch 112 of conventional design is positioned in each of the bores 110. The electrical leads 113 and 115 for each of the switches 112 extend outwardly from the bore 110 into the recessed area 106 and extend outwardly from one end of housing 101 to the cab of the vehicle, as will be described hereinafter. Cover or lid 114 is secured to housing members 102 and 104 to cover channel 106, as seen in the drawings. An elongated sensor slide 116 preferably constructed of a UHMW plastic material is slidably mounted in channel 108 and will be described as including ends 118 and 120. Sensor slide 116 could also be constructed from polyethylene. A conventional magnet 122 is selectively threadably adjustable mounted in threaded bore 124 inwardly of end 120 of slide 116. End 118 of slide 116 is connected to rod 30 of a cylinder 26A, 26B, 26C or 26D by a bracket 122 so that slide 116 moves with rod 30 as rod 30 is extended from the associated cylinder and retracted into the associated cylinder.

Figure 8:
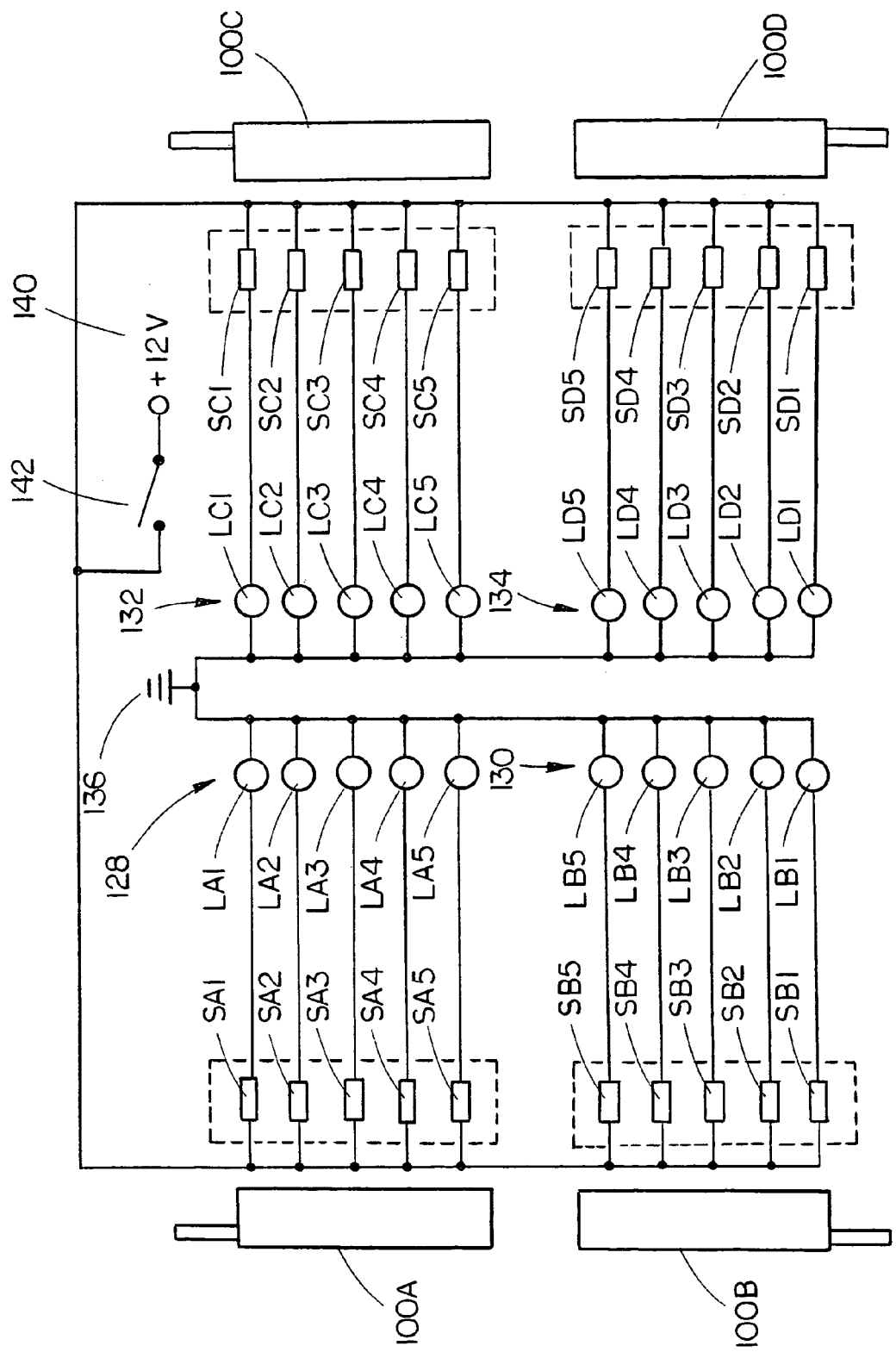
FIG. 8 is a schematic of the instant invention.

The electrical leads 113 and 115 from each of the switches 112 extend outwardly from one end of the housing 101 and are encased in a flexible sheath 124. Sheaths 124 and the leads 113 and 115 from each of the switches 112 extend to the cab of the vehicle for connection to a circuit which is contained within a display panel housing 126 including four rows of LEDs referred to by the reference numerals 128, 130, 132 and 134, respectively. Each of the rows of LEDs has a plurality of LEDs therein which correspond to the number of switches 112 in each position sensor 100. The number of switches 112 in each sensor may vary. For purposes of schematic illustration, the sensors 100 will be referred to by the reference numerals 100A, 100B, 100C and 100D, as previously stated. Also for purposes of description, the switches 112 within sensor 100A will be identified as switches SA1–SA5, the switches 112 within sensor 100B will be identified as switches SB1–SB5, the switches 112 within sensor 100C will be identified as switches SC1–SC5, and the switches within sensor 100D will be identified as switches SD1–SD5. Switches SA1–SA5 are connected to LEDs LA1–LA5, respectively; switches SB1–SB5 are connected to LEDs LB1–LB5, respectively; switches SC1–SC5 are connected to LEDs LC1–LC5, respectively; and switches SD1–SD5 are connected to LEDs LD1–LD5, respectively. The circuit of FIG. 8 is grounded at 130 and is powered by the vehicle electrical system 140 and controlled by switch 142.

Assuming that the wheels of the vehicle are at their most narrow wheel track position and it is desired to widen the track width, the following steps are accomplished. Switch 142 is first closed to power the circuit. Since the hydraulic cylinders 26A, 26B, 26C and 26D are in their fully retracted position, the magnets 122 in the sensors 100A, 100B, 100C and 100D will be positioned immediately below switches SA5, SB5, SC5 and SD5 which causes those switches to close so that LEDs LA5, LB5, LC5 and LD5 will be illuminated indicating that the cylinders are in their retracted positions with the wheels being spaced apart at their most narrow track width. The vehicle is then driven slowly either rearwardly or forwardly and hydraulic cylinder 26A is extended. The vehicle is moved as described to lessen the strain on the cylinder during the adjustment procedure. Cylinder 26A is extended until the desired spacing is achieved for wheel 16 as indicated by the particular LED LA1–4 being illuminated. Assuming that the cylinder 26A is to be extended to its maximum extension, cylinder 26A is extended until LA1 is illuminated. Cylinder 26B is then extended until LB1 is illuminated. Cylinder 26C is then extended until LC1 is illuminated and cylinder 26D is extended until LD1 is illuminated. While it has been described that the cylinders 26A, 26B, 26C and 26D are sequentially activated, two or more of the cylinders could be activated simultaneously.

Thus it can be seen that a device has been provided which enables the track width of a sprayer or the like to be adjusted without the operating leaving the vehicle cab. The wheel adjustable is readily easily and precisely controlled.

Thus it can be seen that the invention accomplishes at least all of its stated objectives.

I claim:

1. In combination:
an adjustable track width vehicle;
said vehicle including a chassis having front and rear ends, and opposite sides;
a front axle assembly at the front end of said chassis;
a rear axle assembly at the rear end of said chassis;
each of said front and rear axle assemblies being selectively extendable in a longitudinal direction between a first and second position;
each of said front and rear axle assemblies including a tubular axle housing having a pair of telescoping axle members mounted therein with each of said axle members having a hydraulic cylinder connected thereto for moving the associated axle member with respect to the respective axle housing to adjust the track width of the vehicle;
each of said axle members having a wheel connected thereto;
each of said hydraulic cylinders including a cylinder having a piston slidably mounted therein and a piston rod secured to said piston which slidably extends from said cylinder;
each of said hydraulic cylinders having a piston rod position sensor associated therewith;
each of said piston rod position sensors being connected to a piston rod position display panel on the vehicle;
each of said piston rod position sensors comprising an elongated housing having a sensor slide longitudinally movably mounted therein;
said elongated housing being fixed with respect to the respective cylinder;
said sensor slide being secured to the respective piston rod for movement therewith;
said elongated housing having a plurality of longitudinally spaced-apart, normally open proximity switches positioned therein;
said sensor slide having a magnet affixed thereto which is adapted to sequentially close said switches as said sensor slide moves with said piston rod relative to the respective cylinder;
each of said switches being electrically connected to a visual indicator on the piston rod position display.

2. In combination:
an adjustable track width vehicle;
said vehicle including a chassis having front and rear ends, and opposite sides;
a front axle assembly at the front end of said chassis;
a rear axle assembly at the rear end of said chassis;
each of said front and rear axle assemblies being selectively extendable in a longitudinal direction between a first and second position;
each of said front and rear axle assemblies including a pair of telescoping axle members with each of said axle members having a hydraulic cylinder connected thereto for moving the associated axle member with respect to said chassis to adjust the track width of the vehicle;
each of said axle members having a wheel connected thereto;
each of said hydraulic cylinders including a cylinder having a piston slidably mounted therein and a piston rod secured to said piston which slidably extends from said cylinder;
each of said hydraulic cylinders having a piston rod position sensor associated therewith;
each of said piston rod position sensors being connected to a piston rod position display panel on the vehicle;
each of said piston rod position sensors comprising an elongated housing having a sensor slide longitudinally movably mounted therein;
said elongated housing being fixed with respect to the respective cylinder;
said sensor slide being secured to the respective piston rod for movement therewith;
said housing having a plurality of longitudinally spaced-apart, normally open proximity switches positioned therein;
said sensor slide having a magnet affixed thereto which is adapted to sequentially close said switches as said sensor slide moves with said piston rod relative to the respective cylinder;
each of said switches being electrically connected to a visual indicator on the piston rod position display.

3. In combination:
an adjustable track width vehicle including a chassis having a front, a rear, and opposite sides;
a wheel assembly at the front and rear on each side of said chassis;
a hydraulic track width adjustable cylinder connected to and extending between said chassis and each of said wheel assemblies;
each of said hydraulic track width adjustment cylinders comprising a cylinder body having a piston rod movably extending therefrom which is movable between extended and retracted positions;
each of said wheel assemblies being moved laterally outwardly with respect to said chassis as the associated hydraulic track width adjustable cylinder is extended and being moved laterally inwardly with respect to said chassis as the associated hydraulic track width adjustment cylinder is retracted;
the actuation of said hydraulic track width adjustable cylinder causing the track width of said vehicle to be varied;
each of said hydraulic track width adjustment cylinders having a piston rod position sensor associated therewith;
each of said piston rod position sensors connected to a piston rod position display on the vehicle;
each of said piston rod position sensors comprising an elongated housing having a sensor slide longitudinally movably mounted therein;
said elongated housing being fixed with respect to the respective cylinder;
said sensor slide being secured to the respective piston rod for movement therewith;

said housing having a plurality of longitudinally spaced-apart, normally open proximity switches positioned therein;

said sensor slide having a magnet affixed thereto which is adapted to sequentially close said switches as said sensor slide moves with said piston rod relative to the respective cylinder;

each of said switches being electrically connected to a visual indicator on the piston rod position display.

4. The vehicle of claim 3 wherein the vehicle includes an operator's station and wherein said piston rod position display is visible from said operator's station.

5. The vehicle of claim 3 wherein the vehicle includes an operator's cab and wherein said piston rod position display is positioned within said operator's cab.

6. The vehicle of claim 3 further wherein each of said hydraulic track width adjustment cylinders is controlled from within said operator's cab.

7. The vehicle of claim 3 wherein each of said piston rod position sensors are selectively removably mounted on said hydraulic track width adjustment cylinders.

* * * * *